US011935418B2

(12) United States Patent
Wulf et al.

(10) Patent No.: US 11,935,418 B2
(45) Date of Patent: Mar. 19, 2024

(54) METHOD AND DEVICE FOR VISUALIZING AN EFFECT OF WIND ON AN AIRCRAFT TRAVEL

(71) Applicant: FREQUENTIS ORTHOGON GMBH, Bremen (DE)

(72) Inventors: Matthias Wulf, Bremen (DE); Mathias de Riese, Bremen (DE)

(73) Assignee: FREQUENTIS ORTHOGON GMBH, Bremen (DE)

( * ) Notice: Subject to any disclaimer, the term of this patent is extended or adjusted under 35 U.S.C. 154(b) by 12 days.

(21) Appl. No.: 17/094,370

(22) Filed: Nov. 10, 2020

(65) Prior Publication Data

US 2021/0150912 A1 May 20, 2021

(30) Foreign Application Priority Data

Nov. 14, 2019 (EP) ..................................... 19209198

(51) Int. Cl.
*G08G 5/00* (2006.01)
(52) U.S. Cl.
CPC ......... *G08G 5/0026* (2013.01); *G08G 5/0082* (2013.01); *G08G 5/0091* (2013.01); *G08G 5/0047* (2013.01)
(58) Field of Classification Search
CPC .. G08G 5/0026; G08G 5/0082; G08G 5/0091; G08G 5/0047; G01C 23/00
See application file for complete search history.

(56) References Cited

U.S. PATENT DOCUMENTS

| 9,939,271 | B1 | 4/2018 | Foster et al. | |
| 2014/0343765 | A1 | 11/2014 | Suiter et al. | |
| 2016/0240090 | A1* | 8/2016 | Marcella | ................ G08G 5/065 |
| 2017/0330465 | A1* | 11/2017 | Kim | ..................... G08G 5/0013 |

FOREIGN PATENT DOCUMENTS

EP          3327700 A1      5/2018

OTHER PUBLICATIONS

1728 Software systems, "Airplane Algebra Calculator"[online], downloaded from url https://web.archive.org/web/20170705072235/ https://www.1728.org/veloccal.htm Jul. 5, 2017[retrieved on Jul. 9, 2022]) (Year: 2017).*

* cited by examiner

*Primary Examiner* — Shon G Foley
(74) *Attorney, Agent, or Firm* — Seed IP Law Group LLP

(57) ABSTRACT

A method for visualizing an effect of wind on an aircraft travel comprising the steps determining at least one wind speed and wind direction for a predefined airspace, identifying a predefined travel route of at least one selected aircraft within the predefined airspace, calculating at least one reference distance flown by the selected aircraft along a route segment of the travel route in a predefined reference time interval, wherein the calculating uses at least one air speed of the selected aircraft at the route segment, the determined wind speed and the determined wind direction, and optionally at least one altitude, visualizing the predefined travel route or the route segment and indicating said reference distance on the visualized predefined travel route or route segment.

15 Claims, 1 Drawing Sheet

METHOD AND DEVICE FOR VISUALIZING AN EFFECT OF WIND ON AN AIRCRAFT TRAVEL

BACKGROUND

Technical Field

The present invention is directed to a method for visualizing an effect of wind on an aircraft travel and the present invention is also directed to a device for visualizing an effect of wind on an aircraft travel.

Description of the Related Art

A typical landing approach of an aircraft involves a portion of travel with predominantly tailwind, also called "downwind leg," of the approach, followed by a turn to intercept with the final landing path, also called "turn to base," which is then followed by a turn of the aircraft onto the final landing path, which is a straight line leading to the runway on which the aircraft flies against the wind to the beginning of the runway.

Due to the different wind directions, in particular tail or head-wind, as well as the deceleration of the aircraft for landing, the distance travelled over ground differs on different parts of this approach route. The air traffic controller who monitors this approach and has the task of ensuring safe separation between successive aircraft approaching to land, typically only has his/her radar screen that only shows current aircraft positions and speed vectors, but does not give any indication about the flight's future progress during approach. In order to lead the aircraft as good as possible in their approach, the traffic controllers use their skills and experiences, also based on recent previous aircrafts which just landed under their control. However, in particular when a traffic controller takes over the duty of another traffic controller, it is difficult to analyze the situation.

Thus at some airports air traffic controllers sometimes have to let a few aircraft approach with larger separations than necessary. This way they get a "feel" for the progress the aircraft makes over ground and can assess the rate at which aircraft can be accepted into approach and distances that need to be maintained in air.

A downside of this method is a temporarily suboptimal use of the available runway capacity, which can be an issue for capacity constrained airports.

The European Patent Office has cited the following prior art documents in the priority application: US 2014/343765 A1, EP 3 327 700 A1 and U.S. Pat. No. 9,939,271 B1.

BRIEF SUMMARY

Provided are techniques that support the air traffic controllers in assessing the required distances by providing and displaying a prediction of the aircraft's progress over ground.

Provided is a method designed for visualizing an effect of wind on an aircraft travel comprising the following steps.

According to one step, at least one wind speed and wind direction is determined for a predefined airspace. Such wind speed and wind direction may be determined and/or used as a two-dimensional or three-dimensional vector. However, according to one possibility, the wind direction may just distinguish between tail wind or head wind, i.e., the wind in the direction of the flight or the wind in the opposite direction. Such tail wind and head wind may be calculated from a particular two-dimensional or three-dimensional vector of the wind. But it may also be possible that only the tail wind and the head wind, i.e., the tail wind component or head wind component, is determined or measured, e.g., by means of the interpretation of the movement of an aircraft.

If the wind speed and wind direction is only determined and/or considered as tail wind or head wind, this may just be indicated by a prefix of the wind speed, i.e., whether this is positive or negative.

According to a simple example, the wind speed and wind direction, according to any of the possibilities explained above, may be considered just as one single wind speed and wind direction for the whole airspace. In this respect, the airspace may define a relevant space in the air the aircraft uses for approaching an airfield, or part of it. However, also a plurality of values for wind speed and wind direction may be considered. These may even be a two-dimensional, three-dimensional or four-dimensional wind field. In case of a four-dimensional wind field, a three-dimensional wind field with the additional component of time is described. Accordingly, the time forms the fourth dimension.

In a further step, identifying a predefined travel route of at least one selected aircraft within the predefined airspace is suggested. Such travel route of said selected aircraft may define the route of the aircraft when approaching the airfield. It may be a straight line just before landing. But it may also include further parts, such as a part of the travel route opposite to the landing direction and, after a turn, a part of the travel route in the direction of landing. The part of the travel route describing the turn may also be included and such travel route of these three parts is also known as a trombone.

According to a further step, calculating at least one reference distance flown by the selected aircraft along a route segment of the travel route in a predefined reference time interval is suggested, wherein the calculating uses at least one air speed of the selected aircraft at the route segment, the determined wind speed and the determined wind direction. Optionally, the calculating uses at least one altitude. In this respect, it might be possible to use an altitude profile.

The air speed of the selected aircraft defines the speed of the aircraft with respect to the air surrounding the aircraft. According to a simple example, the calculating of the reference distance is done by using the air speed of the selected aircraft and adding the determined wind speed, if, according to the determined wind direction, the determined wind speed is a tail wind, or subtracting the absolute value of the wind speed, if the wind direction indicates a head wind.

As the wind speed may change depending on the altitude, it is suggested to also consider the altitude. However, this may also be incorporated in the wind speed and wind direction, if the wind speed and wind direction is provided as a wind field considering the altitude.

According to a further step, visualizing the predetermined travel route or the route segment is suggested. This can in particular be on a display used by an air traffic controller.

As a further step is suggested to indicate said reference distance on the visualized predefined travel route or route segment. Accordingly, such reference distance, i.e., for a known or predefined time interval, is calculated and indicated on the display on the travel route or route segment. In this way, only the effect of the wind speed and wind direction on the flight of the aircraft is indicated on the travel route or route segment. In this way, the most important information of the wind, in view of the air traffic controller, is extracted and indicated on the travel route or route segment, i.e., indicated on the display.

There is the idea underlying that the wind speed may already be known to the air traffic controller, including the wind direction, but such information may be quite complex, as its influence on the aircraft depends on the particular position of the aircraft. The aircraft, when approaching an airfield, is also decreasing its speed. For a particular device which includes a data processor, such calculation might be simple. However, the underlying idea is to calculate and isolate such particular effect on the reference distance.

This also considers that for an air traffic controller it is most important to lead the aircraft such that a particular separation, i.e., a distance between two aircraft landing on the same runway one after another, must be ensured. At the same time, such separation shall not become too large, as that would reduce the possible number of landings per hour or per day.

According to one aspect, for an aircraft travelling in a flight direction with an air speed V, the predefined reference distance $\Delta d$ is calculated using the formula $\Delta d = (V+Vw)\Delta t$ with Vw defining a wind speed component in the flight direction and $\Delta t$ defining the predefined reference time interval. In addition or alternatively, for calculating the predefined reference distance, the wind speed and wind direction are represented by a head wind or tail wind. Accordingly, the wind speed and the wind direction are represented by the head wind or the tail wind.

The head wind or tail wind indicate a wind direction, i.e., whether the wind is blowing against the flight direction or with the flight direction. In this respect, the head wind or the tail wind, respectively, include an amount of the wind speed and a wind direction, i.e., blowing against or with the flight direction. Such head wind or tail wind may thus be a component of a more complex wind vector. However, the head wind or tail wind component, respectively, may be determined directly, i.e., by observing the behavior of a flying aircraft, or might be extracted from such more complex wind vector.

In this respect, said formula $\Delta d = (V+Vw)\Delta t$ uses the head wind or tail wind as the wind speed component Vw. Whether the wind speed component is head wind or tail wind may be identified by the prefix of the value of the wind speed Vw.

In this way, the reference distance may be calculated in an easy and reliable way.

According to one aspect, a virtual aircraft is chosen as one of the selected aircraft and for the virtual aircraft a generic flight is predetermined having predetermined flight properties at least for the air speed and the travel route. Accordingly, a virtual travel route is designed and visualized and on such virtual travel route said reference distance is indicated. Said reference distance is calculated using said predetermined flight properties. Such virtual travel route with indicated reference distance was found to be helpful for the air traffic controller to consider the influence of the current wind conditions on other expected flights as well. In other words, such virtual travel route having said reference distance indicated serves as a general guidance for the air traffic controller.

In particular, it is suggested to use average properties and/or a constant air speed. By using average properties, such travel route can better serve as a general guidance for the air traffic controller. Using a constant air speed results in making such virtual travel route with said reference distance less complicated. That also enhances the suitability of such virtual travel route having said virtual travel distance to serve as a general guidance for the air traffic controller.

Alternatively, at least one current aircraft is chosen as one of the selected aircraft. Accordingly, not a virtual aircraft but a real aircraft is chosen, in particular one which is approaching an actual airfield. For such current aircraft, actual flight properties of said aircraft are used, at least for the air speed and for the travel route. Accordingly, an existing travel route of an aircraft soon approaching the airfield is visualized and enhanced by indicating at least one reference distance. In this way, the air traffic controller can better anticipate the influence of the wind on the current flight and thus he can better anticipate the movement of the aircraft along its travel route. In this way, each actual flight of an aircraft approaching the airfield can better be controlled by the air traffic controller.

However, it is also possible to visualize more than one travel route and in this way at least one of such travel routes can be said virtual travel route and at least one further travel route can be an actual travel route of a current aircraft on its actual flight. In this way, the virtual travel route can still serve as a general guidance for the air traffic controller, whereas in addition, the visualization of at least one actual travel route is enhanced.

In particular, it is suggested to visualize at least two actual travel routes of two aircraft subsequently approaching the airfield. In this way, at least these two aircraft can adequately be guided by the air traffic controller when approaching the airfield, i.e., the flight until landing.

Even when two or even more current aircraft are chosen to visualize their travel route, each by indicating said reference distance, the travel route of at least one virtual aircraft may in addition be visualized and indicated by said reference distance.

According to one aspect, for each selected aircraft, a trajectory is determined and each trajectory incorporates the determined wind speed, the determined wind direction, an altitude profile and an air speed profile. The determined wind speed and wind direction may be provided as a wind vector, or the wind direction may just be provided as an information whether the wind speed corresponds to head wind or tail wind. By the altitude profile, the altitude of the aircraft for each position is incorporated in the trajectory. As the aircraft approaches an airfield and the landing on the airfield is prepared, the air speed, i.e., the travel of the aircraft relative to the surrounding air, changes. It may also change due to a change of flight direction, in particular when changing from a situation having tail wind to a situation having head wind. Accordingly, the air speed can be incorporated as an air speed profile into the trajectory.

It is further suggested to display each trajectory in a map view as a graph, whereas at least part of the displayed trajectory comprises predicted or predetermined values in the future. The trajectory is thus, generally speaking, a flight route having additional information, in particular when the aircraft is at which point of the flight route. However, further information such as the speed of the aircraft, in particular the air speed of the aircraft, is an additional information given for particular points or sections of the trajectory. Accordingly, any information assigned to points or parts of the travel route which the aircraft has not reached yet is thus information, i.e., values in the future. i.e., in other words, the trajectory can also be understood as a plan for travelling of the aircraft, at least for these parts of the travel route which the aircraft has not reached yet. This also includes the at least one reference distance.

Each reference distance calculated for parts of the flight route the aircraft has not reached yet is thus a reference distance in the future. This can also be called a predicted reference distance. Preferably, a plurality of reference distances is calculated and assigned to the travel route and/or to the trajectory and some of these reference distances are thus predicted reference distances.

It is further suggested that each displayed trajectory comprises markers, indicating said at least one reference distance on the graph. As a result, a line is displayed representing the trajectory and on this line a plurality of markers are provided each indicating one reference distance. In particular, such reference distance is indicated by the distance from one marker to another. The result is a line having a plurality of markers with varying distances. These varying distances between these markers indicate the change of speed of the aircraft over ground, as such reference distance is calculated based on the air speed of the aircraft and the wind speed, including wind direction. Accordingly, such line having these markers visualizes the change of speed of the aircraft over ground. It incorporates the slowing down of the aircraft due to approaching the airfield in order to land and it includes the influence of the wind speed. By using such markers to indicate the reference distances, an important information of the travel of the aircraft is illustrated in a simple manner for the air traffic controller.

Such predicted or predetermined values, in particular such values which are predicted or predetermined in the future, include preferably a horizontal position with respect to ground and optionally the altitude. In addition, a time for each position is also part of the predicted or predetermined values in the future. By using the time, it is possible to interpolate between two positions.

The horizontal position is most important and should be part of said predicted or predetermined values in the future and preferably such horizontal position is identified by a latitude value and a longitude value (lat-and-long position).

According to one aspect, for each selected aircraft a plurality of reference distances is calculated and indicated on said visualized predefined travel route or route segment in a row, wherein each reference distance is calculated for the same reference time interval. Accordingly, the result is a travel route having one indication after another, in particular having one marker after another on the travel route. Accordingly, the distance of two markers indicates a reference distance. In this way, a simple but efficient illustration of reference distances and thus a good illustration of the travel and/or expected travel of the corresponding aircraft over ground is provided. The advantages have been explained above.

According to one aspect, for each selected aircraft a predetermined travel route or route segment is chosen, comprising at least two sections having different directions, and at least one reference distance is calculated and indicated for each section. The underlying idea is that aircraft approaching an airfield often change their direction, if they travel with tail wind but have to change direction in order to land with head wind. In particular, such change of route of about 180° is called a trombone. In addition to the change of speed of the aircraft due to slowing down for landing, the speed over ground also changes due to changing from tail wind to head wind. The reference distances for flying with tail wind are longer than the reference distances flying against head wind.

This phenomenon can thus easily be illustrated in particular for the air traffic controller by providing indications of the reference distances on each section of the travel route. These indications, in particular markers, provide an illustration of this change of speed over ground by changing the flight direction. Also in this respect it is a preferred feature for generally all embodiments and or aspects of the present application to use the same reference time interval for each reference distance, at least for each reference distance of a flight route.

As a result, such markers on the section of the travel route being with the wind show a longer distance than the corresponding markers on that section of the travel route at which the aircraft flies against the wind.

According to one aspect, for each selected aircraft the at least one reference distance is indicated by means of digits given along the visualized predefined travel route or route segment indicating each reference distance. In this way, the reference distance can precisely be indicated at the travel route or route segment. As it is indicated along the visualized predefined travel route or part of it, these reference distances are visualized as they are indicated along the travel route or route segment but are also precise as they are given as digits, i.e., they are given as numbers.

In addition or alternatively, at least one reference distance is indicated by means of markers provided in a row along a graph in a map view, the graph representing the travel route or route segment. In this way, the reference distance can easily be indicated on such graph and in this way be visualized for an air traffic controller. In particular, there is a distance between two markers on the graph and this distance corresponds to the reference distance. One possibility to provide such markers is just to put one marker at a particular starting point on the graph and to put the next marker at a point which the aircraft reaches after the predefined reference time interval.

However, it is also possible and suggested to design the shape and/or length and/or color of a marker indicating the size of the reference distance. One possibility is to indicate the reference distance by an arrow pointing in the direction of movement of the aircraft or such that the arrow has a length corresponding to the reference distance. The value of the reference distance may also be indicated by a thickness of the marker. In particular, such length, size and/or thickness of such marker is proportional to the reference distance.

According to one aspect, reference time intervals of different length could be used and the particular length of each reference time interval could be indicated by the shape and/or length and/or color of a marker. In particular, such length, size and/or thickness of such marker is proportional to the reference time interval.

Advantages of using markers have already been described above. It is also an aspect to provide markers and digits as well. Accordingly, one reference distance is indicated by a marker and a digit.

According to one aspect, for each selected aircraft the at least one reference distance is indicated by means of a plurality of markers provided along a graph in a map view, the graph representing the travel route or route segment, wherein the markers are indicating reference distances in a row. The row is set with respect to at least one of the following features.

According to one feature, the row is set prior landing with a last marker representing a point of landing. Accordingly, there is a row of markers, i.e., along the graph one marker after the other is put and the distance between each marker corresponds to a reference distance. If this row of markers is provided such that the last marker represents a point of landing, the last reference distance is thus the reference distance before landing.

One advantage of providing the row of markers in this way is that such row of markers always contains a full reference distance just before landing. Accordingly, the last distance indicated on the graph before landing corresponds to a full distance. This avoids the problem that the last marker is, for example, just half a reference distance away from the landing point and thus the distance between such last marker and the landing point could be misinterpreted as a reference distance.

According to another or additional feature, the row is set starting from a predefined route point of the travel route with a first marker representing the route point. In this way, such predefined route point could be a starting point from which the air traffic controller guides the aircraft. In this way, starting the guidance of the aircraft and a first reference distance can be combined. At such starting point it is also important to indicate the first reference distance in order to identify the speed of the aircraft over ground.

One possibility of predefining such route point is to identify a remaining travel time, e.g., for a particular number of reference time intervals, i.e., the overall time of 20 reference time intervals. Corresponding to these time intervals the markers are set depending on the wind and the movement of the aircraft. In this way, the air traffic controller can also get the information on how much distance to landing is left over. However, this does of course not exclude that the planned travel route and/or trajectory may be changed. In particular, it may be changed by the air traffic controller using such reference distance or reference distances.

According to a further or optional feature, the row is set starting from a current point in time, with a first marker representing the position of the selected aircraft at said point in time. In this way, the illustration can be started by a particular point in time and this may have the advantage that if for many aircraft the same point in time is selected, the travel routes and/or trajectories of all these aircraft can easily be compared, in particular the different approaches of these aircraft can be compared.

In a similar way, a feature is suggested according to which the row is set from a first point in time of a set of points in time of equal time intervals, with a first marker representing the position of the selected aircraft at the first point of time of the set of points in time, wherein for each aircraft the same set of points in time is used. Accordingly such set of points of time may e.g., define a set of points in time for each full minute, if the time interval is one minute. However, it could also be two minutes or 30 seconds, to give two further examples. This will give a good overview of future positions of all aircraft for which trajectories with such markers are shown, since the markers on all trajectories represent the same points in time.

According to one aspect, determining at least one wind speed and wind direction is implemented by determining a three-dimensional wind field or a four-dimensional wind field, wherein the predefined airspace is defined by a plurality of three-dimensional or four-dimensional positions, wherein a three-dimensional position is defined by a horizontal position (in particular latitude and longitude) and an altitude, and a four-dimensional position is defined by a horizontal position, an altitude and time, and the three-dimensional wind field or the four-dimensional wind field assigns a wind speed and wind direction to each three-dimensional position or four-dimensional position, respectively.

In this way, information of the wind speed and wind direction is available for basically each point in space. In addition, a variation over time can be considered using the four-dimensional version. However, a variation in time may also be considered in a different manner, i.e., by using time variant information for each point in space.

However, it is also possible that a three-dimensional position is not varying in all three dimensions. If an aircraft flies along one line and descends in order to prepare for landing, the altitude varies and the horizontal position varies in one direction, but not in two directions. Accordingly, depending on how the coordinate system is defined, the position may only vary with respect to one out of two horizontal coordinates.

Also provided is a device, in particular an air traffic control device, for visualizing an effect of wind on an aircraft travel. Such device comprises:

a determination unit for determining at least one wind speed and wind direction for a predefined airspace, an identification unit for identifying a predefined travel route of at least one selected aircraft within the predefined airspace, a calculation unit for calculating at least one reference distance flown by the selected aircraft along a route segment of the travel route in a predefined reference time interval, wherein the calculation unit is prepared to perform the calculation such that the calculating uses at least one air speed of the selected aircraft at the route segment, the determined wind speed and the determined wind direction, and optionally at least one altitude, a visualization unit for visualizing the predefined travel route or the route segment and a control unit for indicating said reference distance on the visualized predefined travel route or route segment.

Such determination unit may be a sensor device for measuring such wind speed. The device may also be provided as a unit having an interface for receiving such information.

The identification unit may be designed as a radar identifying an aircraft and having computing means for identifying a predefined travel route by calculating such travel route, e.g., as a prediction, or as a partial prediction. Such identification unit may also in addition or alternatively be designed as a unit having an interface for receiving information of a predefined travel route. Such predefined travel route may also be calculated for a virtual aircraft.

The calculation unit may be designed as a microprocessor and/or as a computer or a device including a computer or microprocessor. The calculation unit may be prepared to perform the calculation by having a corresponding calculation program implemented. The described steps for calculating the at least one reference distance are thus by means of a computer, processor or in another way, implemented on the calculation unit. In particular, such calculation unit is prepared to perform any of the described steps for visualizing the effect of wind on an aircraft according to at least one aspect explained above.

The visualization unit may be or comprises a display, in particular a radar display.

The control unit may be designed as or comprising a microprocessor connected to the visualization unit, in order to prepare and submit the at least one reference distance for visualizing on the visualization unit. A microprocessor, which may be part of the visualization unit and/or the control unit, may combine information of the travel route and information of said reference distance, in order to combine these on the visualization unit, in particular on a display or screen.

According to one aspect, the device for visualizing an effect of wind on an aircraft travel is prepared to perform a method according to any of the predescribed aspects. In particular, the features and/or steps may be implemented on this device for visualization. In particular, such aspects or steps may be implemented on the corresponding determination unit, identification unit, calculation unit, visualization unit or control unit.

BRIEF DESCRIPTION OF THE SEVERAL VIEWS OF THE DRAWINGS

The invention will now be described below in more detail by way of example using the accompanying figures.

DETAILED DESCRIPTION

The invention is directed to a method and corresponding device for providing the effect of wind on an aircraft to air traffic controllers in an effective manner.

According to one aspect, this is done by informing about the distance flown in a predefined time interval by a specific or generic aircraft with a known air speed and considering head or tail wind. Such predefined time interval may be 1 minute, to give one useful example. However, the predefined time interval may also be 2 minutes or 5 minutes or 10 minutes or a value in between or it may also be smaller like 30 seconds, to give a further example. The distance flown in a predefined time interval is denominated as reference distance. Such reference distance may be calculated for a generic aircraft, which may also be called a virtual aircraft, or for a specific aircraft, which may also be called a current or existing aircraft. Informing about the reference distance may also be for a generic aircraft and a specific aircraft simultaneously or one or more generic aircraft and a plurality of specific aircraft simultaneously.

Figure 1:
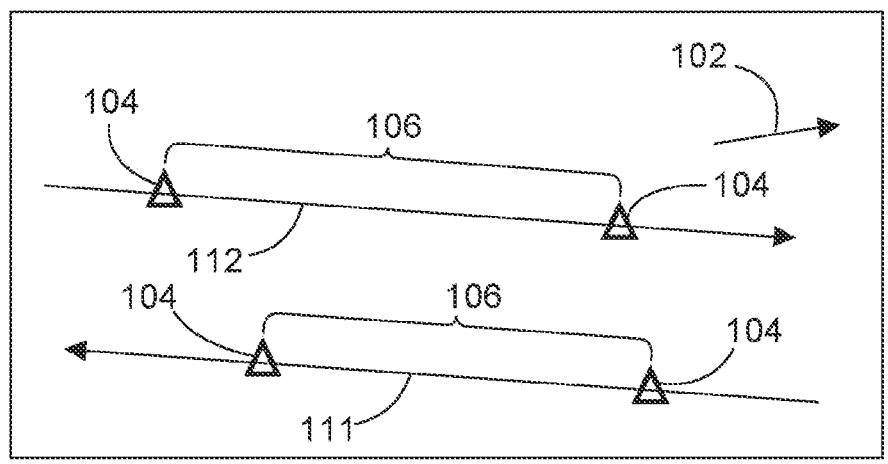
FIG. 1 is a diagram illustrating the effect of wind on the movement of an aircraft.

FIG. 1 shows a diagram illustrating such reference distances. In FIG. 1, a wind speed and direction, i.e., a wind vector 102, is illustrated as a corresponding arrow. FIG. 1 also shows a first flight direction 111 and a second flight direction 112. The first flight direction 111 is basically against the wind direction and thus according to the first flight direction the wind shown in FIG. 1 acts as head wind, whereas for the second flight direction 112 the wind acts as tail wind.

In FIG. 1, a triangle represents an aircraft 104 each flying along the first flight direction 111 or the second flight direction 112, respectively. The position of the aircraft 104 is shown at a first position and at a position after a predefined reference time interval has elapsed. Such predefined reference time interval could be 1 minute, to give one example. For both flight directions, the same reference time interval is used. Accordingly, taking the example of the time interval being 1 minute, FIG. 1 shows the distance flown by the same aircraft in 1 minute. Accordingly, FIG. 1 shows for both flight directions a reference distance 106 for each flight direction 111 and 112, respectively. The reference distance 106 of the first flight direction 111 is shorter than the reference distance 106 of the second flight direction. However, in order to illustrate that there is the same reference time interval underlying, i.e., 1 minute according to the above example, the same reference numeral 106 is chosen.

Accordingly, it is illustrated in FIG. 1 that the distance flown by the same aircraft with the same air speed at the same altitude in 1 minute, but in opposite directions, is influenced by the wind. With tail wind it is larger and with head wind it is smaller.

To illustrate such reference distance 106, such reference distance can be indicated on a visualized predefined travel route or route segment.

According to one aspect, for a specific aircraft, a full and detailed trajectory incorporating the measured or predicted wind is used or calculated and the trajectory is displayed in a map view for at least part of the future as a line with markings at the position at integer multiples of the chosen time interval. e.g., such markings can be placed on the trajectory for every minute. However, instead of 1 minute, 2 minutes, 5 minutes or 30 seconds could be selected as a predefined reference time interval, to give a few other examples. This can be into the future from the current time or from the current position of the aircraft or it can be from the last full hour and then also every full minute, to use this example again. Providing such indication into the future from the current time or position could thus directly be used for controlling or guiding such flight of a specific aircraft. However, applying this from the last hour also enhances the visualization of the wind affecting the flight of the aircraft.

Figure 2:
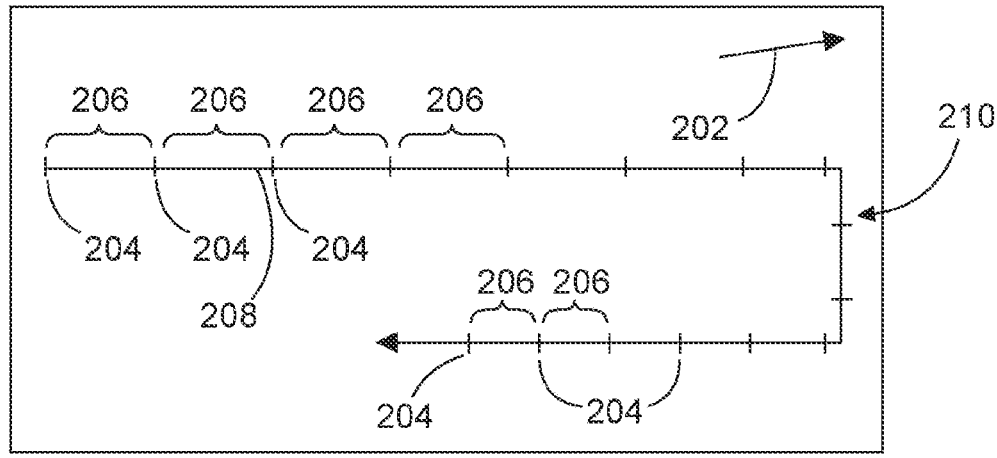
FIG. 2 is a diagram illustrating the indication of reference distances on a typical travel route of an aircraft approaching an airfield.

FIG. 2 illustrates this aspect with an example trajectory and markers at 1 minute intervals. Of course, taking 1 minute again as the predefined reference time interval is only an example and any other time interval can be chosen. The distance between two subsequent markers 204 is thus a reference distance 206. Accordingly, each reference distance 206 is indicated by two markers 204. The reference distances 206 according to FIG. 2 have a varying size, but the same reference numeral 206 is used in order to indicate that the same predefined reference time interval is underlying for each reference distance 206. Accordingly, FIG. 2 shows such example trajectory 208 and there is also the wind speed and wind direction indicated by a wind vector 202.

The distance between the markers 204 shows not only the effect of wind, but also the deceleration during a straight-line part of the flight route, as the aircraft is preparing for landing. An air traffic controller may use the presented information to better judge where to turn the aircraft. Such possible turn 210 is also indicated in the example trajectory 208. Accordingly, such example trajectory is also called a trombone trajectory according to similarities to said musical instrument.

It is important to note that one main task for an air traffic controller is to ensure a minimum separation between two aircraft subsequently approaching the same runway. Accordingly, the proposed indication of the reference distances 206 assists an air traffic controller by ensuring such separation.

Accordingly, FIG. 2 can also be understood as an example for a trajectory-based display or trajectory-based illustration or trajectory-based indication of the predetermined reference distance, as such reference distances 206 are indicated in such trajectory.

According to one aspect, for a generic aircraft a part of the route relevant for the air traffic controller and typically flown by aircraft controlled by the air traffic controller and a typical aircraft performance model and speed and altitude profile is suitably chosen and a generic trajectory is calculated along this route segment for the chosen model and profiles. Accordingly, such generic trajectory is provided based on or for a generic aircraft, i.e., for a virtual aircraft, and the generic trajectory may also be called a virtual trajectory.

Such generic or virtual trajectory is displayed in the same way as shown above for the specific aircraft in FIG. 2. Such display is updated whenever an updated wind measurement and/or an updated forecast are received. This aspect shall explicitly cover unrealistic speed and altitude profiles, such as constant true air speed (TAS) which may be better suited to visualize the relevant information, in particular the effect of the wind.

According to one aspect, it is suggested to use a simplified calculation. For a route fragment which is a straight line between two points A and B extending a short distance D such that the measured or predicted wind speed component Vw along that line at the typical altitude of the flights and the typical air speed V of the flights may be assumed to be constant. Based on that, the typical distance Δd flown over ground in a predefined time interval Δt may be calculated as Δd=(V+Vw)Δt.

This distance Δd is thus the reference distance and it may be displayed as a number or marked off along a line displayed in a map view representing the route segment between A and B.

There are several possibilities to combine variants of three main aspects of the invention.

According to one aspect, the reference distance may be calculated per each flight separately or for a generic flight with average properties. It is also possible to do both.

According to a second aspect, the reference distance may be calculated based on a predicted 4D trajectory or assuming constant speed.

According to third aspect, there are different possibilities to display the predicted distance flown. One possibility is to display the distance flown, i.e., the predefined reference distance, as digits in a suitable unit, e.g., as nautical miles. Another possibility is that the predefined reference distances are marked off along a line along the route fragment in a map view, e.g., on a radar screen.

Another possibility is to provide markers in a map view, e.g., on a radar display, representing the predicted position at integer multiples of the predefined time interval. This can be done prior to landing, or it can be done from a predefined route point. It can also be done from the current time or it can be done from one of a set of points in time of equal time intervals, wherein the set of points in time is equal for at least two aircrafts. e.g., the time interval may be one minute and the starting point is a full minute and thus also each point is at a full minute.

Figure 3:
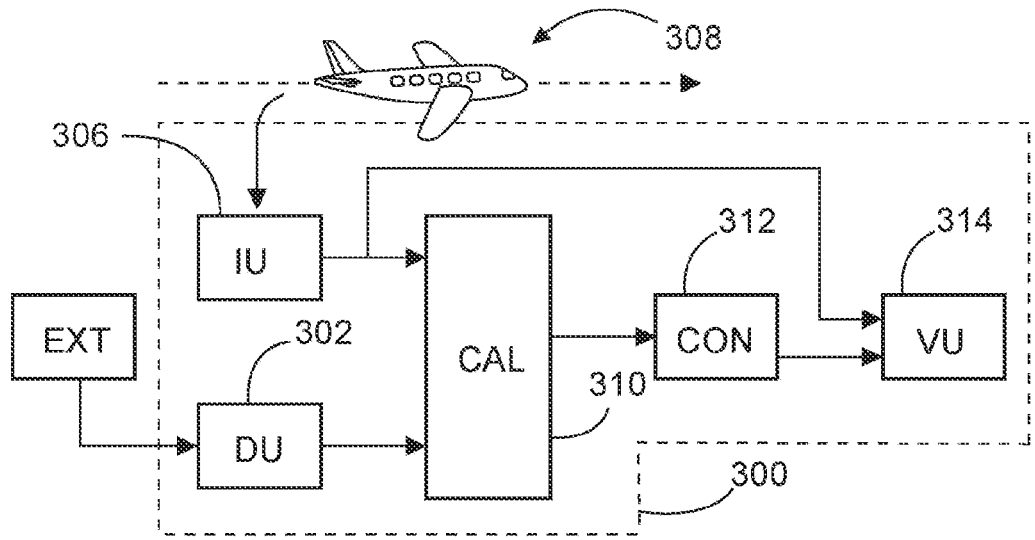
FIG. 3 is a schematic diagram of a device for visualizing an effect of wind on an aircraft travel.

FIG. 3 illustrates a device 300 surrounded by a dashed line, for visualizing an effect of wind on an aircraft travel. Such device 300 comprises a determination unit or circuit 302 for determining at least one wind speed and wind direction for a predefined airspace. Such determination unit 302 may receive corresponding weather information from an external provider 304 of such weather information, in particular of a weather forecast.

An identification unit or circuit 306 is provided for identifying a predefined travel route of at least one selected aircraft 308. The identification unit 306 may receive corresponding information from said aircraft 308 or from an external system providing this information.

The determination unit 302 provides the information of the wind speed and wind direction to a calculation unit or circuit 310. The calculation unit 310 also receives information on the predefined travel route from the identification unit 306. Based on that, the calculation unit 310 calculates at least one reference distance flown by the selected aircraft 308. However, a virtual or generic aircraft may also be used and the identification unit 306 may provide such generic information or the calculation unit 310 may have such information already implemented.

At any case, the calculation unit 310 calculates the at least one reference distance flown by the selected aircraft and submits this at least one reference distance to a control unit or controller 312.

The reference distance shall be visualized or displayed on a visualization unit or display device 314. The visualization unit 314 also receives information on the travel route from the identification unit 306 in order to display that travel route. In addition, the visualization unit 314 receives information on how to indicate said reference distance from the control unit 312. The control unit 312 thus provides such information on indicating said reference distance in such a way that the reference distance may be indicated at or along the travel route.

The travel route to be displayed may also be understood as the trajectory. A trajectory basically comprises the travel route with additional information and if only that part of the trajectory is displayed, which corresponds to the travel route, then displaying the travel route or displaying part of that trajectory is to be understood as being equivalent.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for visualizing an effect of wind on aircraft travel of a plurality of aircraft, the method comprising:
   determining at least one wind speed and wind direction for a predefined airspace,
   identifying predefined travel routes for the plurality of aircraft within the predefined airspace, wherein each of the predefined travel routes defines a route for the respective aircraft of the plurality of aircraft when approaching an airfield,
   calculating reference distances flown by each aircraft along route segments of its travel routes in a predefined reference time interval, wherein the calculating uses:
   at least one air speed of the respective aircraft at the respective route segment,
   the determined wind speed, and
   the determined wind direction,
   on a display, displaying, to an air traffic controller, the predefined travel routes or the route segments; and
   indicating, on the display, the reference distances on the displayed predefined travel routes or route segments.

2. The method according to claim 1, wherein:
   for each aircraft traveling in a flight direction with an airspeed v, the reference distance Δd is calculated using the formula $$\Delta d = (v + v_W)\Delta t$$

with $v_W$ defining a wind speed component in the flight direction, and
   Δt defining the predefined reference time interval.

3. The method according to claim 2, wherein the determined wind speed and the determined wind direction are represented by a head wind or tail wind.

4. The method according to claim 1, wherein:
a virtual aircraft is chosen as one aircraft of the plurality of aircraft; and
for the virtual aircraft, a generic flight is predetermined having predetermined flight properties at least for the air speed and the travel route.

5. The method according to claim 4, wherein the predetermined flight properties for the virtual aircraft has average properties and a constant air speed.

6. The method according to claim 3, wherein
for each aircraft, actual flight properties of said aircraft are used, at least for the air speed and for one of the travel routes.

7. The method according to claim 1, wherein the method comprises:
for each aircraft of the plurality of aircraft a trajectory is determined; and
each trajectory incorporates:
the determined wind speed,
the determined wind direction,
an altitude profile, and
an airspeed profile,
each trajectory is displayed in a map view as a graph, wherein at least part of the displayed trajectory comprises predicted or predetermined values in the future, and
each displayed trajectory comprises markers indicating the at least one reference distance on the graph.

8. The method according to claim 1, wherein the reference distances are displayed in a row.

9. The method according to claim 1, wherein:
for each aircraft:
predefined travel routes or route segments are chosen, comprising at least two sections having different directions, and
at least one reference distance is calculated and indicated for each section.

10. The method according to claim 1, wherein:
for each aircraft, reference distances are indicated by at least one indication of the list comprising:
digits given along the displayed predefined travel route or route segment indicating each reference distance, and
markers provided in a row along a graph in a map view, the graph representing the travel route or route segment.

11. The method according to claim 1, wherein:
for each aircraft, the reference distances are indicated by a plurality of markers provided along a graph in a map view, the graph representing the travel route or route segment, wherein the markers are indicating reference distances in a row, the row is set with respect to at least one feature of the list comprising:
the row is set prior landing with a last marker representing a point of landing,
the row is set starting from a predefined route point of the travel route, with a first marker representing the route point,
the row is set starting from a current point in time, with a first marker representing the position of the respective aircraft at said point in time, and
the row is set from a first point in time of a set of points in time of equal time intervals, with a first marker representing the position of the aircraft at the first point of time of the set of points in time, wherein for each aircraft the same set of points in time is used.

12. The method according to claim 1, wherein:
determining at least one wind speed and wind direction is implemented by determining a three-dimensional wind-field or a four-dimensional wind-field, and
the predefined airspace is defined by a plurality of three-dimensional or four-dimensional positions, wherein:
a three-dimensional position is defined by a horizontal position and an altitude, and
a four-dimensional position is defined by a horizontal position, an altitude and time, and
the three-dimensional wind-field or the four-dimensional wind-field assigns a wind speed and wind direction to each three-dimensional position or four-dimensional position, respectively.

13. The method according to claim 1, wherein the calculating further uses an altitude of each aircraft.

14. A device for visualizing an effect of wind on aircraft travel, the device comprising:
a determination circuit for determining at least one wind speed and wind direction for a predefined airspace,
an identification circuit for identifying predefined travel routes of a plurality of aircraft within the predefined airspace, wherein each of the predefined travel routes define a route for the respective aircraft of the plurality of aircraft when approaching an airfield,
a calculation circuit for calculating reference distances flown by each aircraft along route segments of its travel routes in a predefined reference time interval, wherein the calculation circuit is configured to perform the calculation such that the calculating uses:
at least one air speed of the respective aircraft at the respective route segment,
the determined wind speed, and
the determined wind direction,
a display device for visualizing the predefined travel routes or the route segments to an air traffic controller, wherein the display device is provided for use to the air traffic controller, and
a controller for indicating said reference distance on the visualized predefined travel routes or route segments.

15. The device according to claim 14, wherein the calculation circuit further uses the at least one altitude to perform the calculation.

* * * * *